(12) United States Patent
Kim et al.

(10) Patent No.: US 11,238,395 B2
(45) Date of Patent: Feb. 1, 2022

(54) APPARATUS AND METHOD FOR EVALUATING RELIABILITY OF NUCLEAR POWER PLANT OPERATOR

(71) Applicant: Korea Atomic Energy Research Institute, Daejeon (KR)

(72) Inventors: Yochan Kim, Daejeon (KR); Jaewhan Kim, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 128 days.

(21) Appl. No.: 16/595,000

(22) Filed: Oct. 7, 2019

(65) Prior Publication Data

US 2020/0342386 A1 Oct. 29, 2020

(30) Foreign Application Priority Data

Apr. 24, 2019 (KR) .......................... 10-2019-0047651

(51) Int. Cl.
*G06Q 10/06* (2012.01)
*G21D 3/00* (2006.01)
*G06F 17/18* (2006.01)

(52) U.S. Cl.
CPC ....... *G06Q 10/06398* (2013.01); *G06F 17/18* (2013.01); *G06Q 10/06316* (2013.01); *G06Q 10/06395* (2013.01); *G21D 3/008* (2013.01)

(58) Field of Classification Search
CPC ....... G06Q 10/06398; G06Q 10/06316; G06Q 10/06395; G06F 17/18; G21D 3/008

(Continued)

(56) References Cited

U.S. PATENT DOCUMENTS 5,606,695 A * 2/1997 Dworzecki ........ G06Q 10/0631
705/7.12
5,671,361 A * 9/1997 Brown .................. G06Q 10/06
705/7.23

(Continued)

FOREIGN PATENT DOCUMENTS

KR 10-1257371 B1 4/2013
WO WO-2014173274 A1 * 10/2014 ............... G21D 3/00

OTHER PUBLICATIONS

Korean Patent Office, Office Action, issued in connection with Korean Application No. 10-2019-0047651, dated Nov. 20, 2020, with English summary, 7 pages.

*Primary Examiner* — Romain Jeanty
(74) *Attorney, Agent, or Firm* — Hanley, Flight & Zimmerman, LLC

(57) ABSTRACT

In an apparatus for evaluating reliability of a nuclear power plant operator, an expected task finishing time for each task of the operator is calculated based on input data for reliability evaluation of the operator to determine a task completion time for each task of the operator based on the calculated expected task finishing time and the input data. An initial time for the tasks is determined based on the input data and the task completion time for a current task. A total execution time of the operator is calculated based on the determined task completion time and initial time. An available time allowed for the operator to complete the tasks is calculated based on a predetermined allowed time and the determined initial time. A task failure probability is obtained from the difference between the calculated total execution time and the calculated available time based on probability distribution information.

6 Claims, 4 Drawing Sheets

(58) Field of Classification Search
USPC .................................................... 705/7.742
See application file for complete search history.

(56) References Cited

U.S. PATENT DOCUMENTS

| | | | | |
|---|---|---|---|---|
| 8,694,350 | B1* | 4/2014 | Cohen | G06Q 10/10 |
| | | | | 705/7.13 |
| 8,990,372 | B2* | 3/2015 | Shikano | G06F 13/10 |
| | | | | 709/223 |
| 10,860,387 | B2* | 12/2020 | Ivancich | G06F 9/52 |
| 2009/0106079 | A1* | 4/2009 | Gutlapalli | G06Q 10/06 |
| | | | | 705/7.26 |
| 2015/0134393 | A1* | 5/2015 | De | G06Q 10/1097 |
| | | | | 705/7.21 |
| 2018/0107965 | A1* | 4/2018 | Namboothiri | G06Q 10/063112 |
| 2018/0157222 | A1* | 6/2018 | Weatherbee | G05B 19/41865 |
| 2019/0188576 | A1* | 6/2019 | Pedersen | G06F 9/5027 |

* cited by examiner

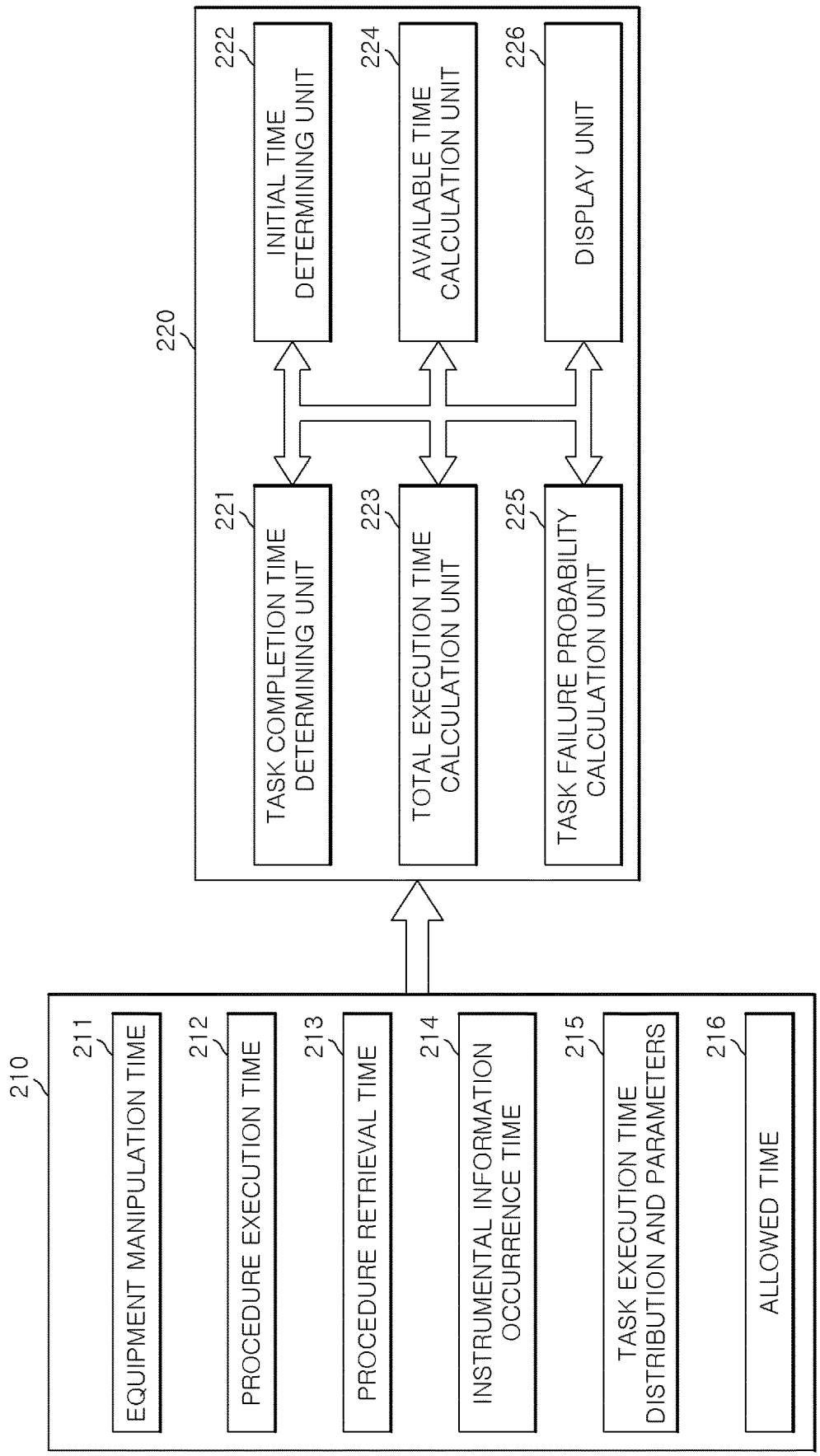

APPARATUS AND METHOD FOR EVALUATING RELIABILITY OF NUCLEAR POWER PLANT OPERATOR

CROSS-REFERENCE TO RELATED APPLICATION

This application claims priority to Korean Patent Application No. 10-2019-0047651, filed on Apr. 24, 2019, the entire contents of which are incorporated herein by reference.

FIELD OF THE INVENTION

The present disclosure relates to a technique for evaluating reliability of a nuclear power plant operator, and more particularly, to an apparatus and method for automatically evaluating reliability of a nuclear power plant operator based on task execution time of the operator.

BACKGROUND OF THE INVENTION

As is known, one of the major issues for the safety evaluation of nuclear power plant operation is predicting reliability of a nuclear power plant operator in the event of a nuclear power plant accident. If the operator fails to complete his task within a given time, the nuclear power plant accident may cause a critical problem. Accordingly, predicting for task failure probability based on the task execution time of the operator is a very important factor in the reliability for the performance of the operator.

However, in evaluating the reliability of the performance of the operator based on the task execution time of the operator, there is no standard for what should be used as a task criterion and what should be considered as the total required execution time. Therefore, the evaluation for reliability of the operator is not performed clearly.

FIG. 1 is a timing diagram schematically illustrating various time indexes used for evaluation for reliability of a nuclear power plant operator.

Referring to FIG. 1, Time_serviceWindow indicates the time at which a task starts or ends from a stopping point of the operation of a reactor in the nuclear power plant, Tcue indicates cue occurrence timing (procedure and nuclear power plant alarm, and instrumental information occurrence) from the stopping point of the reactor, and TimeRequired indicates the total execution time, Time_manipulation indicates the equipment manipulation time for the task, and Time_recognition indicates the time required for the operator to recognize the task.

In the timing situation of the above time indexes, the reliability of the operator may be considered as a statistical probability for the difference between TimeRequired and TimeAvailable, or as a statistical probability for the difference between Time_recognition and TimeAvailable.

However, in the conventional method, when there are a plurality of cues for an accident event in any of the above two cases, it is ambiguous to calculate TimeAvailable and TimeRequired, which makes the result of the probability calculation unclear.

SUMMARY OF THE INVENTION

In view of the above, the present disclosure provides a reliability evaluation apparatus and method for automatically evaluating reliability of a nuclear power plant operator based on task execution time of the operator.

In accordance with an aspect of the present disclosure, there is provided an apparatus for evaluating reliability or a nuclear power plant operator, the apparatus comprising: a task completion time determining unit configured to calculate an expected task finishing time for each of tasks of the operator based on input data for reliability evaluation of the operator and determine a task completion time for each task of the operator based on the calculated expected task finishing time and the input data; an initial time determining unit configured to determine an time for the tasks cased on the input data and the task completion time for a current task which has been determined by the task completion time determining unit; a total execution time calculation unit configured to calculate a total execution time of the operator based on the task completion time for the last task of the operator which has been determined by the task completion time determining unit and the initial time which has been determined by the initial time determining unit; an available time calculation unit configured to calculate an available time allowed for the operator to complete the tasks based on a predetermined allowed time for the tasks of the operator included in the input data and the determined initial time; and a task failure probability calculation unit configured to obtain a task failure probability from the difference between the calculated total execution time and the calculated available time based on probability distribution information.

In accordance with another aspect of the present disclosure, there is provided a method for evaluating reliability of a nuclear power plant operator, the method comprising: calculating an expected task finishing time for each of tasks of the operator based on input data for reliability evaluation of the operator and determine a task completion time for each task of the operator based on the calculated expected task finishing time and the input data; determining an initial time for the tasks based on the input data and the determined task completion time for a current task; calculating a total execution time of the operator based on the determined task completion time for the last task of the operator and the determined initial time; calculating an available time allowed for the operator to complete the tasks based on a predetermined allowed time for the tasks of the operator included in the input data and the calculated initial time; and obtaining a task failure probability from the difference between the calculated total execution time and the calculated available time based on probability distribution information.

According to the aspect of the present disclosure, it is possible to predict an accident occurrence probability in nuclear power plant operation through the safety evaluation of the nuclear power plant which automatically evaluates reliability of a nuclear power plant operator based on the task execution time of the operator. Therefore, the safety of the nuclear power plant operation can be effectively improved.

BRIEF DESCRIPTION OF THE DRAWINGS

The objects and features of the present disclosure will become apparent from the following description of embodiments, given in conjunction with the accompanying drawings, in which:

FIG. 2 is a block diagram illustrating an apparatus for evaluating reliability of a nuclear power plant operator based on task execution time of the operator according to one embodiment of the present disclosure.

DETAILED DESCRIPTION OF THE EMBODIMENTS

Figure 1:
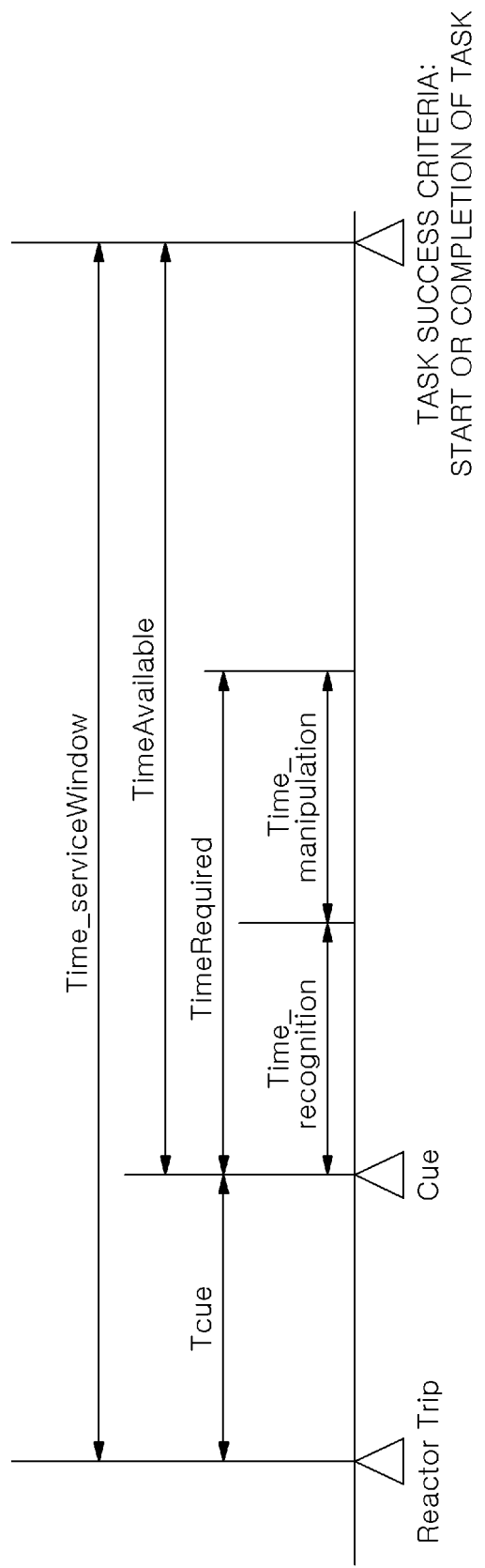
FIG. 1 shows a timing diagram schematically illustrating various time indexes used for evaluation of reliability of a nuclear power plant operator.

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Hereinafter, an apparatus for evaluating reliability of a nuclear power plant operator based on task execution time of the operator according to one embodiment of the present disclosure will be described in detail with reference to FIG. 2.

FIG. 2 is a block diagram illustrating an apparatus for evaluating reliability of a nuclear power plant operator based on task execution time of the operator according to one embodiment of the present disclosure. The operator's reliability evaluation apparatus 200 comprises an interface module 210 for inputting data and a reliability evaluation module 220 for automatically performing the reliability evaluation for the operator based on the input data.

Referring to FIG. 2, the interface module 210 is used to provide various data required for reliability evaluation, for example, an equipment manipulation time 211, a procedure execution time 212, a procedure retrieval time 213, an instrumental information occurrence time (instrumentation cue time) 214, task execution time distribution and parameters 215 and an allowed time 216, to the reliability evaluation module 220. Such data can be input by, e.g., a user of the interface module 210 for reliability evaluation of the operator.

The equipment manipulation time 211 indicates a period of time required for the operator to manipulate an equipment, for example. The equipment manipulation time corresponds to Time_manipulation in FIG. 1

The procedure execution time 212 indicates a period of time required for the operator to perform the tasks of the procedure.

The procedure retrieval time 213 indicates a period of time required for the operator to retrieve a specific procedure and start the tasks of the specific procedure. The procedure retrieval time can be seen as a kind of Time_recognition in FIG. 1.

The instrumental information occurrence time 214 indicates a point of time when specific information is displayed on a measuring instrument in the nuclear power plant, an instrument panel or the like from a stoppage time of a reactor, for example.

The execution time distribution and parameters 215 indicate a probability distribution (e.g., log-normal distribution) of the task execution time of the operator and estimated values of related parameters.

The allowed time 216 indicates a point of time given to the operator for completing the tasks to be performed by the operator.

The reliability evaluation module 220 includes a task completion time determining unit 221, an initial time determining unit 222, a total execution time calculation unit 223, an available time calculation unit 224, a task failure probability calculation unit 225, and a display unit 226.

The task completion time determining unit 221 receives the equipment manipulation time 211, the procedure execution time 212, the procedure retrieval time 213 and the instrumental information occurrence time 214 from the interface module 210. The task completion time determining unit 221 calculates an expected task finishing time for each of the tasks of the operator based on the received data (e.g., the equipment manipulation time 211, the procedure execution time 212 and the procedure retrieval time 213) and determines a task completion time for each task of the operator based on the calculated expected task finishing time and the instrumental information occurrence time 214. For example, the expected task finishing time may be the sum of the equipment manipulation time 211, the procedure execution time 212 and the procedure retrieval time 213.

Specifically, the task completion time determining unit 221 compares the instrumental information occurrence time 214 with the expected task finishing time, and determines the expected task finishing time as the task completion time if the expected task finishing time is later (larger) than the instrumental information occurrence time 214 or determines the instrumental information occurrence time 214 as the task completion time if the instrumental information occurrence time 214 is later (larger) than the expected task finishing time.

Further, the task completion time determining unit 221 determines the sum of the instrumental information occurrence time and the expected cask finishing time as the task completion time if the expected task finishing time is significantly earlier (smaller) than the instrumental information occurrence time by a predetermined reference time (e.g., 2 hours) or more.

The initial time determining unit 222 calculates an initial time when the operator started the given task based on the instrumental information occurrence time 214 provided from the interface module 210 and the task completion time provided from the task completion time determining unit 221.

Particularly, the initial time determining unit 222 determines the instrumental information occurrence time 214 as the initial time if the expected task finishing time is significantly earlier (smaller) than the instrumental information occurrence time by a predetermined reference time (e.g., 2 hours) or more.

The total execution time calculation unit 223 calculates a total execution time of the operator based on the task completion time for the last task of the operator provided from the task completion time determining unit 221 and the initial time provided from the initial time determining unit 222. The total execution time means the task execution time of the operator from the initial time to the task completion time, which corresponds to TimeRequired in FIG. 1.

The available time calculation unit 224 calculates an available time allowed for the operator to complete the task based on the allowed time 216 for the tasks of the operator provided from the interface module 210 and the initial time provided from the initial time determining unit 222, which corresponds to TimeAvailable in FIG. 1.

The task failure probability calculation unit 225 obtains a task failure probability from the difference between the calculated total execution time provided from the total execution time calculation unit 223 and the calculated available time provided from the available time calculation unit 224 based on probability distribution information provided from the interface module 21.

According to the present embodiment, the task failure probability is obtained by calculating the occurrence probability of the relationship of (average of the total execution time of the operator)>(average of the available time) based on the cumulative probability distribution function (e.g., log-normal distribution).

The display unit 226 displays the task failure probability calculated through the task failure probability calculation unit 225 numerically or graphically through a display panel (monitor or the like). The display unit 226 can display evaluation for reliability of the operator based on the task execution time of the operator.

According to the present embodiment, the procedure execution time and the procedure retrieval time may be defined as a procedural cue time (calculated expected task finishing time in the current cue (task)) and the instrumental information occurrence time may be defined as an instrumental cue time. In the present embodiment, assuming that the task execution of the operator is based on the procedure manual, it is possible to create an evaluation model for automatically calculating the task failure probability using the procedural cue time and the instrumental cue time.

The procedural cue time indicates the sum of the operator's task execution time taken to reach the previous cue and the calculated procedure execution time, and the instrumental cue time indicates the time when information is provided (displayed) through an alarm or a monitor screen.

Hereinafter, a series of processes for performing the evaluation for reliability of a nuclear power plant operator based on the task execution time of the operator using the apparatus for evaluating reliability of the nuclear power plant operator of the present embodiment will be described in detail.

Figure 3A:
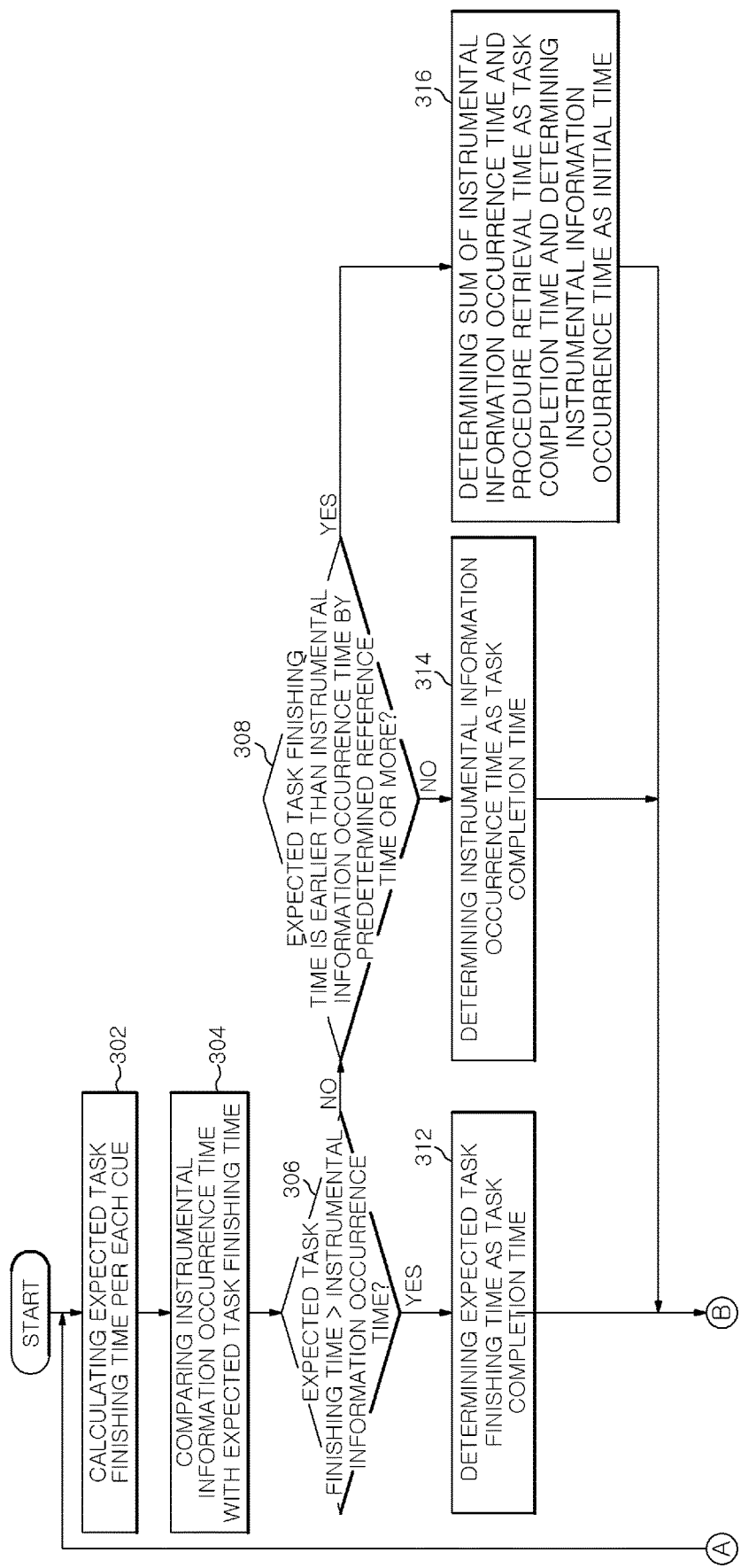
FIGS. 3A and 3B are a flowchart showing a method for automatically evaluating the reliability of the nuclear power plant operator based on task execution time of the operator according to one embodiment of the present disclosure.
Figure 3B:
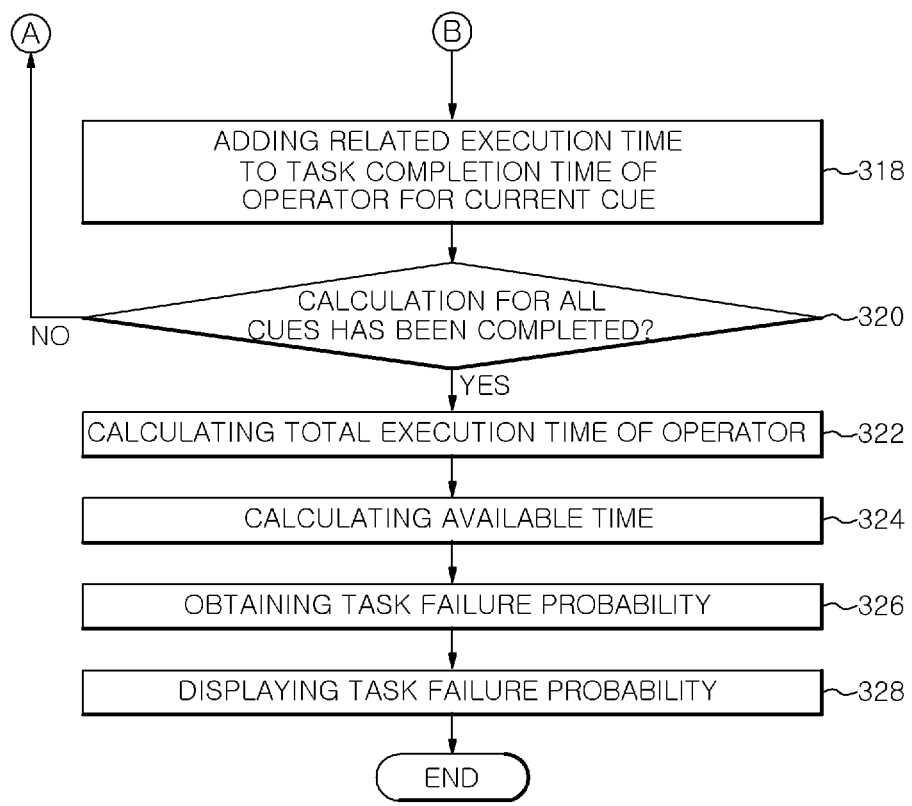

FIGS. 3A and 3B are a flowchart illustrating a method for automatically evaluating the reliability of a nuclear power plant operator based on the task execution time of the operator according to one embodiment of the present disclosure.

Referring to FIGS. 3A and 3B, the task completion time determining unit 221 calculates an expected task finishing time per each cue (task) required for an operator to complete a given task based on the equipment manipulation time 211, the procedure execution time 212, the procedure retrieval time 213 and the instrumental information occurrence time 214 provided from the interface module 210, and determines a task completion time to reach a procedure for the current cue (step 302).

To this end, the task completion time determining unit 221 compares the instrumental information occurrence time 214 with the expected task finishing time (step 304), and determines a task completion time for the current cue based on the comparison result.

The task completion time determining unit 221 determines the expected task finishing time as the task completion time for the current cue (step 312) if the expected task finishing time is later (larger) than the instrumental information occurrence time 214 (YES in step 306). Then, the process proceeds to step 318 to be described later.

The task completion time determining unit 221 determines the instrumental information occurrence time 214 as the task completion time for the current cue (step 314) if the expected task finishing time is equal to or earlier (smaller) than the instrumental information occurrence time 214 (NO in step 306).

Meanwhile, the task completion time determining unit 221 determines the sum of the instrumental information occurrence time and the procedure retrieval time as the task completion time for the current cue (step 316) if the expected task finishing time is earlier (smaller) than the instrumental information occurrence time by a predetermined reference time (e.g., 2 hours) or more (YES in step 308). Then, the process proceeds to the step 318. At this time, the initial time determining unit 222 determines the instrumental information occurrence time 214 as the initial time if the expected task finishing time is significantly earlier (smaller) than the instrumental information occurrence time by the predetermined reference time or more and provides the determined result to the task completion time determining unit 221.

The task completion time determining unit 221 adds the related execution time (equipment manipulation time) to the task completion time of the operator for the current cue (step 318). Then, whether or not the calculation for all the cues has been completed is checked (step 320).

If it is determined in the step 320 that the calculation for all the cues has been completed, the total execution time calculation unit 223 calculates the total execution time of the operator, i.e., the difference between the task completion time and the initial time of the operator, based on the task completion time provided from the task completion time determining unit 221 the initial time provided from the initial time determining unit 222 (step 322).

The available time calculation unit 224 calculates the available time, i.e., the difference between the allowed time 216 for the tasks of the operator and the initial time of the operator (step 324).

The task failure probability calculation unit 225 obtains a task failure probability from the difference between the calculated total execution time provided from the total execution time calculation unit 223 and the calculated available time provided from the available time calculation unit 224 based on probability distribution information, i.e., a probability distribution of the execution time of the operator and estimated values of related parameters, provided from the interface module 21 (step 326).

The task failure probability may be obtained by calculating the occurrence probability of the relationship of (average of the total execution time of the operator)>(average of the available time) based on the cumulative probability distribution function.

The display unit 226 displays the task failure probability calculated through the task failure probability calculation unit 225 numerically or graphically through a display panel (monitor or the like) (step 328).

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the present disclosure has been shown and described with respect to the embodiments, it will be understood by those skilled in the art that various changes and modifications may be made without departing from the scope of the present disclosure as defined in the following claims.

What is claimed is:

1. An apparatus for evaluating reliability of a nuclear power plant operator, the apparatus comprising at least a processor implementing:
   a task completion time determining unit configured to calculate an expected task finishing time for each of tasks of the operator based on input data for reliability evaluation of the operator and determine a task completion time for each task of the operator based on the calculated expected task finishing time and the input data;
   an initial time determining unit configured to determine an initial time for the tasks based on the input data and the task completion time for a current task which has been determined by the task completion time determining unit;
   a total execution time calculation unit configured to calculate a total execution time of the operator based on the task completion time for the last task of the operator which has been determined by the task completion time determining unit and the initial time which has been determined by the initial time determining unit;
   an available time calculation unit configured to calculate an available time allowed for the operator to complete the tasks based on a predetermined allowed time for the tasks of the operator included in the input data and the determined initial time; and
   a task failure probability calculation unit configured to obtain a task failure probability from the difference between the calculated total execution time and the calculated available time based on probability distribution information,
   wherein the task completion time determining unit, the initial time determining unit, the total execution time calculation unit, the available time calculation unit, and the task failure probability calculation unit are embodied by the processor,
   wherein the input data for reliability evaluation of the operator includes an equipment manipulation time, a procedure execution time, a procedure retrieval time, and an instrumental information occurrence time for each task, and
   wherein the task completion time determining unit compares the calculated expected task finishing time with the instrumental information occurrence time, and determines the expected task finishing time as the task completion time if the expected task finishing time is later than the instrumental information occurrence time and determines the instrumental information occurrence time as the task completion time if the instrumental information occurrence time is later than the expected task finishing time.

2. The apparatus of claim 1, wherein the probability distribution information includes a probability distribution of the execution time of the operator and estimated values of related parameters.

3. The apparatus of claim 1, further comprising:
   a display unit configured to display the calculated task failure probability numerically or graphically through a display panel.

4. An apparatus for evaluating reliability of a nuclear power plant operator, the apparatus comprising at least a processor implementing:
   a task completion time determining unit configured to calculate an expected task finishing time for each of tasks of the operator based on input data for reliability evaluation of the operator and determine a task completion time for each task of the operator based on the calculated expected task finishing time and the input data;
   an initial time determining unit configured to determine an initial time for the tasks based on the input data and the task completion time for a current task which has been determined by the task completion time determining unit;
   a total execution time calculation unit configured to calculate a total execution time of the operator based on the task completion time for the last task of the operator which has been determined by the task completion time determining unit and the initial time which has been determined by the initial time determining unit;
   an available time calculation unit configured to calculate an available time allowed for the operator to complete the tasks based on a predetermined allowed time for the tasks of the operator included in the input data and the determined initial time; and
   a task failure probability calculation unit configured to obtain a task failure probability from the difference between the calculated total execution time and the calculated available time based on probability distribution information,
   wherein the task completion time determining unit, the initial time determining unit, the total execution time calculation unit, the available time calculation unit, and the task failure probability calculation unit are embodied by the processor, wherein the input data for reliability evaluation of the operator includes an equipment manipulation time, a procedure execution time, a procedure retrieval time, and an instrumental information occurrence time for each task, and wherein the initial time determining unit determines an instrumental information occurrence time for the current task as the initial time if the expected task finishing time is earlier than the instrumental information occurrence time by a predetermined reference time or more.

5. The apparatus of claim 4, wherein the total execution time calculation unit calculates a task execution time from the initial time determined by the initial time determining unit to the task completion time as the total execution time of the operator.

6. A method for evaluating reliability of a nuclear power plant operator implemented by a processor, the method comprising:

calculating an expected task finishing time for each of tasks of the operator based on input data for reliability evaluation of the operator and determine a task completion time for each task of the operator based on the calculated expected task finishing time and the input data;

determining an initial time for the tasks based on the input data and the determined task completion time for a current task;

calculating a total execution time of the operator based on the determined task completion time for the last task of the operator and the determined initial time;

calculating an available time allowed for the operator to complete the tasks based on a predetermined allowed time for the tasks of the operator included in the input data and the calculated initial time; and obtaining a task failure probability from the difference between the calculated total execution time and the calculated available time based on probability distribution information, wherein the input data for reliability evaluation of the operator includes an equipment manipulation time, a procedure execution time, a procedure retrieval time, and an instrumental information occurrence time for each task, and wherein, in the calculating the expected task finishing time, the calculated expected task finishing time is compared with the instrumental information occurrence time, and the expected task finishing time is determined as the task completion time if the expected task finishing time is later than the instrumental information occurrence time and the instrumental information occurrence time is determined as the task completion time if the instrumental information occurrence time is later than the expected task finishing time.

* * * * *